(12) United States Patent
Manapat et al.

(10) Patent No.: US 6,541,998 B2
(45) Date of Patent: Apr. 1, 2003

(54) ACTIVE TERMINATION CIRCUIT WITH AN ENABLE/DISABLE

(75) Inventors: Rajesh Manapat, San Jose, CA (US); P. Kannan Srinivasagam, San Jose, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/836,994

(22) Filed: Apr. 17, 2001

(65) Prior Publication Data

US 2002/0149390 A1 Oct. 17, 2002

(51) Int. Cl.[7] .................. H03K 19/003; H03K 17/16
(52) U.S. Cl. .................. 326/30; 326/26; 326/27; 326/83; 326/86
(58) Field of Search .................. 326/26, 27, 30, 326/83, 86, 90, 113

(56) References Cited

U.S. PATENT DOCUMENTS

| | | | | |
|---|---|---|---|---|
| 5,111,075 A | * | 5/1992 | Ferry et al. | 326/27 |
| 5,329,190 A | * | 7/1994 | Igarashi et al. | 326/30 |
| 5,557,221 A | * | 9/1996 | Taguchi et al. | 327/53 |
| 5,565,796 A | * | 10/1996 | Nakase | 326/30 |
| 5,973,544 A | * | 10/1999 | Ohno | 323/313 |
| 6,008,665 A | * | 12/1999 | Kalb et al. | 326/30 |
| 6,031,395 A | * | 2/2000 | Choi et al. | 326/112 |
| 6,100,713 A | | 8/2000 | Kalb et al. | 326/30 |
| 6,246,259 B1 | * | 6/2001 | Zaliznyak et al. | 326/41 |
| 6,259,269 B1 | * | 7/2001 | Hui | 326/21 |
| 6,388,495 B1 | * | 5/2002 | Roy et al. | 326/30 |

OTHER PUBLICATIONS

"Termination Techniques for High–Speed Buses", By Karthik Ethirajan and John Nemec, EDN Magazine, Feb. 16, 1998, Issue 04, 9 pages.

* cited by examiner

*Primary Examiner*—Michael G. Lee
*Assistant Examiner*—Steven S. Paik
(74) *Attorney, Agent, or Firm*—Christopher P. Maiorana, P.C.

(57) ABSTRACT

A termination circuit for use on a conductor of a transmission line. The termination circuit generally comprises a first, second, third and fourth transistor. The first transistor may have (i) a first drain node couplable to the conductor, (ii) a first source node couplable to a first power source presenting a first reference voltage, and (iii) a first gate node. The second transistor may have (i) a second drain node couplable to the conductor, (ii) a second source node couplable to a second power source presenting a second reference voltage, and (iii) a second gate node. The third transistor (i) may have a third source node coupled to the first gate node and (ii) may be configured to bias the first gate node to a first voltage below the first reference voltage. The fourth transistor (i) may have a fourth source node coupled to the second gate node and (ii) may be configured to bias the second gate node to a second voltage above the second reference voltage.

17 Claims, 4 Drawing Sheets

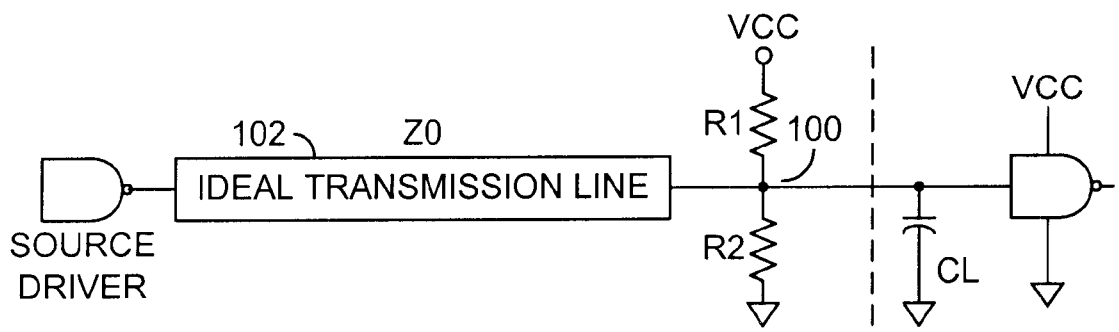
(CONVENTIONAL)
FIG. 1
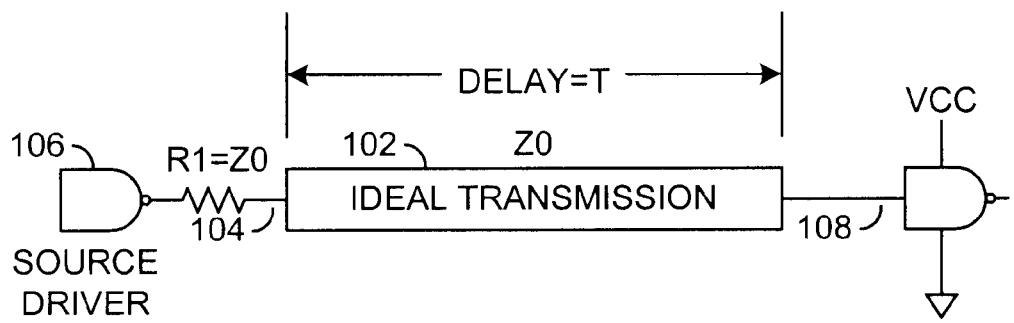
(CONVENTIONAL)
FIG. 2

ACTIVE TERMINATION CIRCUIT WITH AN ENABLE/DISABLE

FIELD OF THE INVENTION

The present invention relates to a method and/or architecture for active termination devices generally and, more particularly, to a method and/or architecture for active termination devices with an enable/disable feature.

BACKGROUND OF THE INVENTION

Transmission line effects are well known. An unterminated transmission line at a receiving end will momentarily experience approximately twice the voltage at the unterminated end as is presented by a source driver at the transmitting end. The excess voltage then reflects from the receiving end and propagates back down the transmission line toward the source driver. To prevent this doubling of the voltage, transmission lines are commonly terminated with a passive termination device having an impedance that substantially matches that of the transmission line. For example, if the transmission line has an impedance of 50 ohms, the passive termination device will be a 50-ohm resistor.

Referring to FIG. 1, a passive termination device at the receiving end 100 of an ideal transmission line 102 is shown. Here, two resistors (i.e., R1 and R2) present a small signal impedance of Z0 to the ideal transmission line 102 to prevent reflections. Referring to FIG. 2, another passive termination device at the transmitting end 104 of the ideal transmission line 102 is shown. Here, a single resistor (i.e., R1) is provided in series with the source driver 106 to absorb reflections created by an unterminated receiving end 108.

Most types of circuits are susceptible to transmission line effects. For example, transmission line effects occur in the telecommunications transmissions over a wire line path, in computer networks over an Ethernet or other interconnecting means, and within the computer system itself. In each of these circuits, the transmission line is terminated with an impedance that substantially matches the impedance of the transmission line to prevent the doubling of the original signal. In many applications, where power consumption is a critical issue, the use of a passive termination device (i.e., a resistor) consumes excessive power. The power consumed by an active termination element, which may be a transistor, can be reduced in comparison to that of the passive, or resistive, termination element.

SUMMARY OF THE INVENTION

The present invention concerns a termination circuit for use on a conductor of a transmission line. The termination circuit generally comprises a first, second, third, and fourth transistor. The first transistor may have (i) a first drain node couplable to the conductor, (ii) a first source node couplable to a first power source presenting a first reference voltage, and (iii) a first gate node. The second transistor may have (i) a second drain node couplable to the conductor, (ii) a second source node couplable to a second power source presenting a second reference voltage, and (iii) a second gate node. The third transistor (i) may have a third source node coupled to the first gate node and (ii) may be configured to bias the first gate node to a first voltage below the first reference voltage. The fourth transistor (i) may have a fourth source node coupled to the second gate node and (ii) may be configured to bias the second gate node to a second voltage above the second reference voltage.

The objects, features and advantages of the present invention include providing a method and/or architecture for active termination devices with an enable/disable feature that (i) result in low power consumption, (ii) are simple in design, (iii) are easily incorporated into existing designs without major changes, and/or (iv) have a termination function that may be controllably enabled/disabled.

BRIEF DESCRIPTION OF THE DRAWINGS

These and other objects, features and advantages of the present invention will be apparent from the following detailed description and the appended claims and drawings in which:

FIG. 1 is a block diagram of a conventional passive termination circuit at a receiving end of a transmission line;

FIG. 2 is a block diagram of a conventional passive termination circuit at a transmitting end of the transmission line;

DETAILED DESCRIPTION OF THE PREFERRED EMBODIMENTS

Figure 3:
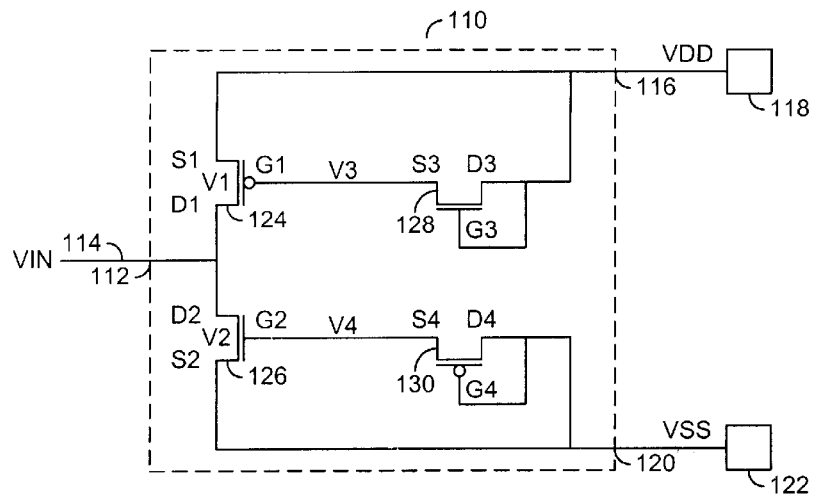
FIG. 3 is a schematic of a termination circuit implementing the present invention.

Referring to FIG. 3, a schematic of a termination circuit 110 is shown in accordance in accordance with a preferred embodiment of the present invention. The termination circuit 110 may have an input 112 that may be coupled to a conductor 114 of a transmission line. The conductor 114 may carry a signal having a voltage (e.g., VIN) to the termination circuit 110. The termination circuit 110 may have an input 116 connected to a first power source 118 and another input 120 connected to a second power source 122. The first power source 118 may present a first reference voltage (e.g., VDD) to the termination circuit 110. The second power source 122 may present a second reference voltage (e.g., VSS) to the termination circuit 110.

The termination circuit 110 generally comprises a transistor 124, a transistor 126, a transistor 128, and a transistor 130. The transistor 124 may have a gate node G1, a drain node D1 coupled to the conductor 114, and a source node S1 coupled to the first power source 118. The transistor 126 may have a gate node G2, a drain node D2 coupled to the conductor 114, and a source node S2 coupled to the second power source 122. The transistor 128 may have a drain node D3 and a gate node G3 coupled to the first power source 118. The transistor 128 may also have a source node S3 coupled to a gate node G1 of the transistor 124. The transistor 130 may have a drain node D4 and a gate node G4 coupled to the second power source 122. The transistor 130 may also have a source node S4 coupled to a gate node G2 of the transistor 126.

The first reference voltage VDD is generally a positive voltage relative to the second reference voltage VSS. In a preferred embodiment, the second reference voltage VSS may be a ground voltage. In other embodiments, the polarities may be reversed to meet the design constraints of a particular implementation.

The transistor 124 and the transistor 130 may be implemented as p-channel enhancement type insulated gate field-effect transistors. The transistor 124 may have a threshold voltage Vt1. The transistor 130 may have a threshold voltage Vt4. The transistor 126 and the transistor 128 may be implemented as n-channel enhancement type insulated gate field-effect transistors. The transistor 126 may have a threshold voltage Vt2. The transistor 128 may have a threshold voltage Vt3.

A channel substrate B1 (not shown) of the transistor 124 may be electrically floating. The channel substrate B1 generally forms diodes with the source node S1 and the drain node D1. The diodes will generally bias the channel substrate B1 to a voltage V1 that is a higher voltage of the first reference voltage VDD or the voltage VIN.

A channel substrate B2 (not shown) of the transistor 126 may be electrically floating. The channel substrate B2 generally forms diodes with the source node S2 and the drain node D2. The diodes will generally bias the channel substrate B2 to a voltage V2 that is a lower voltage of the second reference voltage VSS or the voltage VIN.

A channel substrate B3 (not shown) of the transistor 128 is generally connected to the source node S3. Parasitic leakage currents generally cause a voltage V3 of the channel substrate B3 and source node S3 to move below the first reference voltage VDD. When the voltage V3 is the threshold voltage Vt3 below the first reference voltage VDD, then the transistor 128 may transition from a non-conducting state to a conducting state. With the transistor 128 in the conducting state, the voltage V3 will generally remain the threshold voltage Vt3 below the first reference voltage VDD.

A channel substrate B4 (not shown) of the transistor 130 is generally connected to the source node S4. Parasitic leakage currents generally cause a voltage V4 of the channel substrate B4 and source node S4 to move above the second reference voltage VSS. When the voltage V4 is the threshold voltage Vt4 above the second reference voltage VSS, then the transistor 130 may transition from the non-conducting state to the conducting state. With the transistor 130 in the conducting state, the voltage V4 will generally remain the threshold voltage Vt4 above the first reference voltage VSS.

The threshold voltages Vt3 and Vt4 may be defined with respect to the threshold voltages Vt1 and Vt2 so that the transistor 124 and the transistor 126 are normally in a non-conducting state or a conducting state. In a preferred embodiment, the threshold voltages Vt3 and Vt4 are defined to be smaller than the threshold voltages Vt1 and Vt3 such that the transistor 124 and the transistor 126 are normally in the non-conducting state. With the transistor 124 and the transistor 126 in the non-conducting state, the termination circuit 110 may consume minimal power. In alternative embodiments, one or both of the threshold voltage Vt3 and Vt4 may be defined to be equal to or larger than the threshold voltages Vt1 and Vt2. Here, the termination circuit 110 may be used to present a bias to the conductor 114 to meet the design criteria of a particular implementation.

Referring to the operation of the termination circuit 110, as the voltage VIN rises above the first reference voltage VDD, the diode formed between the drain node D1 and the channel substrate B1 may become forward biased. As the voltage VIN continues to rise then the forward biased diode may cause the voltage V1 to rise. When the voltage V1 is above the voltage V3 (at the gate node G1) by the threshold voltage Vt1, then the transistor 124 generally transitions from the non-conducting state to the conducting state. While the transistor 124 is in the conducting state, the voltage VIN on the conductor 114 is generally clamped to the first reference voltage VDD by the first power source 118.

As the voltage VIN falls below the second reference voltage VSS, the diode formed between the drain node D2 and the channel substrate B2 may become forward biased. As the voltage VIN continues to fall then the forward biased diode may cause the voltage V2 to fall. When the voltage V2 is below the voltage V4 (at the gate node G2) by the threshold voltage Vt2, then the transistor 126 generally transitions from the non-conducting state to the conducting state. While the transistor 126 is in the conducting state, the voltage VIN on the conductor 114 is generally clamped to the second reference voltage VSS by the second power source 122.

Figure 4:
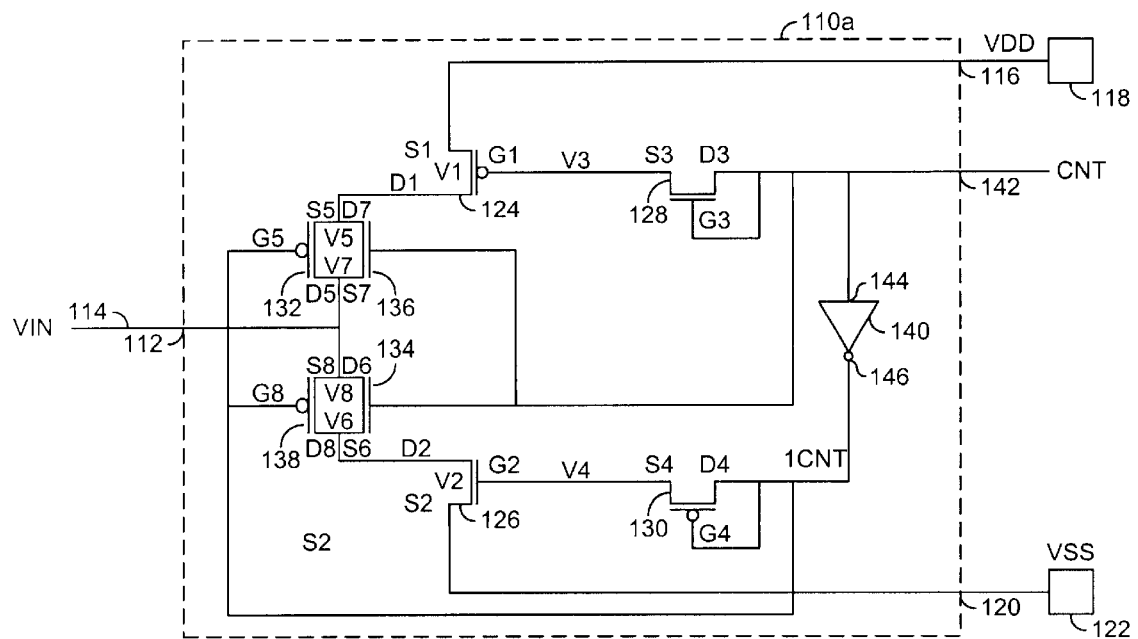
FIG. 4 is a schematic of another termination circuit implementing the present invention.

Referring to FIG. 4, a schematic of another termination circuit 110A is shown. The termination circuit 110A may have the input 112 connected to the conductor 114 to receive the signal VIN. The termination circuit 110A, may also have the inputs 116 and 120 to receive the first reference voltage VDD and the second reference voltage VSS respectively. The termination circuit 110A generally comprises the transistor 124, the transistor 126, the transistor 128, the transistor 130, a transistor 132, a transistor 134, a transistor 136, an transistor 138, and an inverter 140. An input 142 may be provided to the termination circuit 110A to receive a signal (e.g., CNT).

The inverter 140 may have an input 144 connected to the input 142 to receive the signal CNT. The inverter 140 may have an output 146 to present a signal (e.g., /CNT). The signal /CNT may be a complement or inverse of the signal CNT.

The source node S1 may be connected to the first power source 118. The gate node G1 may be connected to the source node S3. The drain node D1 may be connected to a source node S5 of the transistor 132 and a drain node D7 of the transistor 136.

The source node S2 may be connected to the second power source 122. The gate node G2 may be connected to the source node S4. The drain node D2 may be connected to a source node S6 of the transistor 134 and a drain node D8 of the transistor 138.

The source node S3 may be connected to the gate node G1. The gate node G3 may be connected to the input 142. The drain node D3 may also be connected to the input 142.

The source node S4 may be connected to the gate node G2. The gate node G4 may be connected to the output 146 of the inverter 140. The drain node D4 may also be connected to the output 146 of the inverter 140.

The source node S5 may be connected to the drain node D1 and the drain node D7. A gate node G5 of the transistor 132 may be connected to the output 146 of the inverter 140. A drain node D5 of the transistor 132 may be connected to the conductor 114.

The source node S6 may be connected to the drain node D2 and the drain node D8. A gate node G6 of the transistor 134 may be connected to the input 142. A drain node D6 of the transistor 134 may be connected to the conductor 114.

A source node S7 of the transistor 136 may be connected to the conductor 114. A gate node G7 of the transistor 136 may be connected to the input 142. The drain node D7 may be connected to the drain node D1 and the source node S5.

A source node S8 of the transistor 138 may be connected to the conductor 114. A gate node G8 of the transistor 138 may be connected to the output 146 of the inverter 140. The drain node D8 may be connected to the drain node D2 and the source node S6.

The transistor 132 and the transistor 138 may be implemented as p-channel enhancement type insulated gate field-effect transistors. The transistor 132 may have a threshold voltage Vt5. The transistor 138 may have a threshold voltage Vt8.

The transistor 134 and the transistor 136 may be implemented as n-channel enhancement type insulated gate field-effect transistors. The transistor 134 may have a threshold voltage Vt6. The transistor 136 may have a threshold voltage Vt7.

A channel substrate B5 (not shown) of the transistor 132 may be electrically floating. The channel substrate B5 generally forms diodes with the source node S5 and the drain node D5. The diodes generally bias the channel substrate B5 to a voltage V5 that is a higher voltage of a voltage at the source node S5 or the voltage VIN.

A channel substrate B6 (not shown) of the transistor 134 may be electrically floating. The channel substrate B6 generally forms diodes with the source node S6 and the drain node D6. The diodes generally bias the channel substrate B6 to a voltage V6 that is a lower voltage of a voltage at the source node S6 or the voltage VIN.

A channel substrate B7 (not shown) of the transistor 136 may be electrically floating. The channel substrate B7 generally forms diodes with the source node S7 and the drain node D7. The diodes generally bias the channel substrate B7 to a voltage V7 that is a lower voltage of a voltage at the drain node D7 or the voltage VIN.

A channel substrate B8 (not shown) of the transistor 138 may be-electrically floating. The channel substrate B8 generally forms diodes with the source node S8 and the drain node D8. The diodes generally bias the channel substrate B8 to a voltage V7 that is a higher voltage of a voltage at the drain node D8 or the voltage VIN.

The signal CNT may be a control signal. The signal CNT may have an enable state and a disable state. In a preferred embodiment, the enable state of the signal CNT may be implemented as a logical HIGH state. The disable state of the signal CNT may be implemented as a logical LOW state. The signal CNT may be received from any one of a variety of sources. For example, the signal CNT may be generated by an external source and routed to the input 142 through an external pin. In another example, the signal CNT may be generated by a test controller (e.g., a JTAG controller) located within a same device as the terminator circuit 110A. In still another example, the signal CNT may be generated internally by another circuit located within the same device as the terminator circuit 110A.

The signal /CNT may be a complement control signal. The signal /CNT may have the enable state and the disable state. The enable state of the signal /CNT may be implemented as the logical LOW state. The disable state of the signal /CNT may be implemented as the logical HIGH state.

The transistor 132 and the transistor 136 generally form a first pass gate in series with the transistor 124. As shown in FIG. 4, the first pass gate may be disposed between in the transistor 124 and the conductor 114. In an alternative embodiment, the first pass gate may be disposed between the transistor 124 and the first power source 118.

The transistor 134 and the transistor 138 generally form a second pass gate in series with the transistor 126. The second pass gate may be disposed between the transistor 126 and the conductor 114. In an alternative embodiment, the second pass gate may be disposed between the transistor 126 and the second power source 122.

The signal CNT generally allows the clamping capability of the termination circuit 110A to be selectively enabled and disabled. The first pass gate and the second pass gate may be configured to couple the transistor 124 and the transistor 126 respectively to the conductor 114 when the signals CNT and /CNT are in the enable state. While the transistor 124 and the transistor 126 are coupled to the conductor 114, the transistor 124 and the transistor 126 may operate to clamp the signal VIN as in the termination circuit 110. The first pass gate and the second pass gate may be configured to uncouple the transistor 124 and the transistor 126 respectively from the conductor 114 when the signals CNT and /CNT are in the disable state. Here, the transistor 124 and the transistor 126 are generally disabled from clamping the signal VIN since there are no conductive paths to the conductor 114. In an alternative embodiment, the transistor 136 and the transistor 138 may be eliminated from the terminator circuit 110A.

In the following example, the signal CNT is generally assumed to be in the enabled state (e.g., at approximately the first reference voltage VDD) and the signal /CNT is generally assumed to be in the enable state (e.g., approximately the second reference voltage VSS). As the signal VIN rises, the diode formed between the drain node D5 and the channel substrate B5 may become forward biased. As the voltage VIN continues to rise then the forward biased diode may cause the voltage V5 to rise. When the voltage V5 is above a voltage at the gate node G5 (e.g., VSS) by the threshold voltage Vt5, then the transistor 132 generally transitions from the non-conducting state to the conducting state. While the transistor 132 is in the conducting state, the conductor 114 may be coupled to the drain node D1 of the transistor 124. Now, clamping of the signal VIN to the first reference voltage VDD may be achieved in the same way as in the terminator circuit 110 shown in FIG. 3.

As the voltage VIN falls, the diode formed between the drain node D6 and the channel substrate B6 may become forward biased. As the voltage VIN continues to fall then the forward biased diode may cause the voltage V6 to fall. When the voltage V6 is below a voltage at the gate node G6 (e.g., VDD) by the threshold voltage Vt6, then the transistor 134 generally transitions from the non-conducting state to the conducting state. While the transistor 134 is in the conducting state, the conductor 114 may be coupled to the drain node D2 of the transistor 126. Now, clamping of the signal VIN to the second reference voltage VSS may be achieved in the same way as in the terminator circuit 110 shown in FIG. 3.

In the following example, the signal CNT is generally assumed to be in the disabled state (e.g., at approximately the second reference voltage VSS) and the signal /CNT is generally assumed to be in the disable state (e.g., approximately the first reference voltage VDD). As the signal VIN rises, the diode formed between the drain node D5 and the channel substrate B5 may become forward biased. As the voltage VIN continues to rise then the forward biased diode may cause the voltage V5 to rise. If the threshold voltage Vt5 is designed to be sufficiently large (e.g., Vt5=−VDD) then the signal VIN may not be able to bias the voltage V5 sufficiently high to cause the transistor 132 to enter the conducting state. Consequently, the transistor 124 may not clamp the signal VIN to the first reference voltage VDD.

As the signal VIN falls, the diode formed between the drain node D6 and the channel substrate B6 may become forward biased. As the voltage VIN continues to fall then the forward biased diode may cause the voltage V6 to fall. If the threshold voltage Vt6 is designed to be sufficiently large (e.g., Vt6=−VSS) then the signal VIN may not be able to bias the voltage V6 sufficiently low to cause the transistor 134 to enter the conducting state. Consequently, the transistor 126 may not clamp the signal VIN to the second reference voltage VSS.

Figure 5:
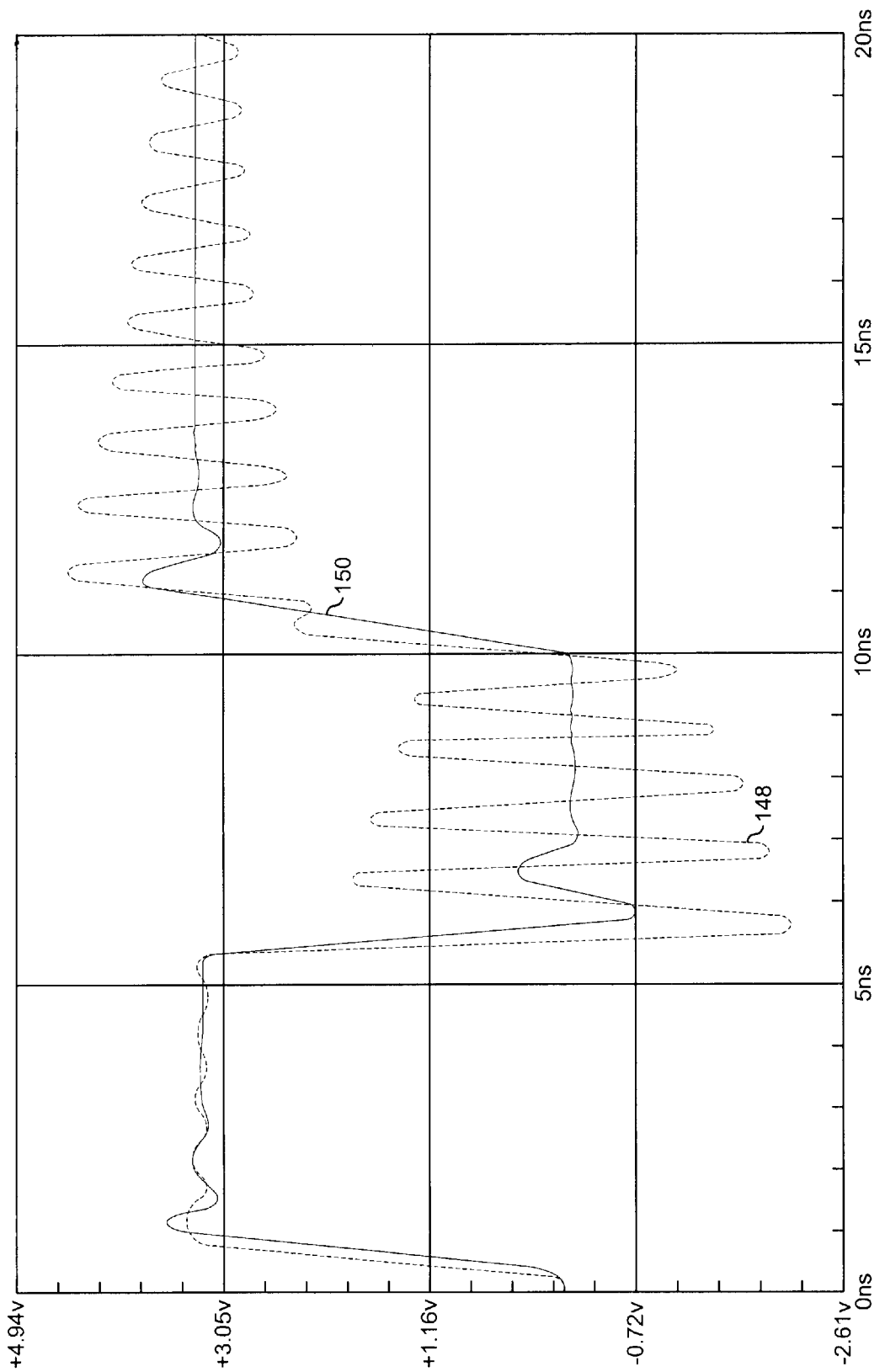
FIG. 5 is a waveform diagram of a signal terminated by the termination circuit.

Referring to FIG. 5, a waveform simulating the signal VIN as terminated by the termination circuit 110A is shown. The first reference voltage VDD may be 3.3 volts in the simulation. The second reference voltage VSS may be zero volts (ground) in the simulation. The signal VIN may be represented by a dashed line 148 while the signal CNT is in the disabled state. The signal VIN may be represented by a solid line 150 while the signal CNT is in the enabled state. An improvement in the oscillation decay of the solid line 150 (terminated) as compared to the dashed line 148 (unterminated) is generally recognizable.

Figure 6:
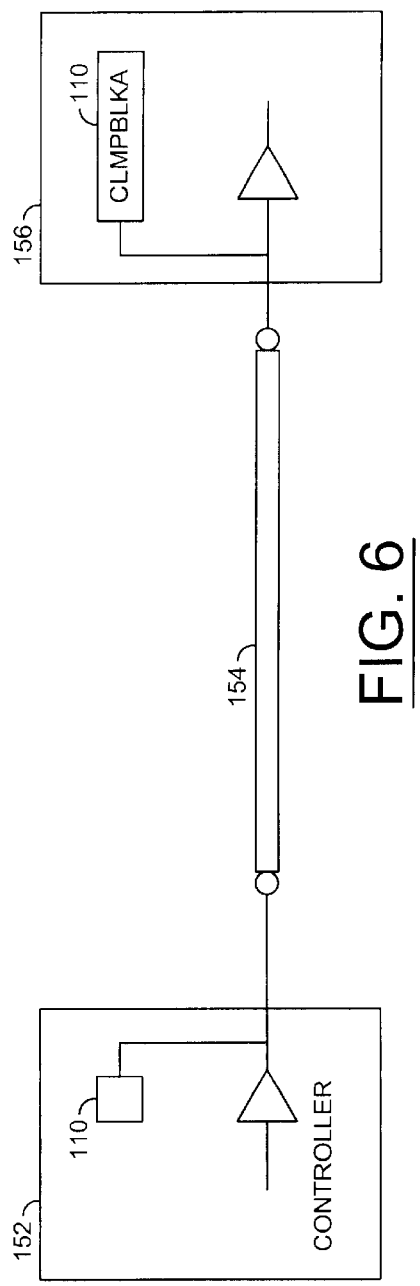
FIG. 6 is a block diagram of a point-to-point transmission system implementing the present invention.

Referring to FIG. 6, a block diagram of a point-to-point transmission line system is shown. The termination circuits 110 and 110A may be used in a variety of applications where transmission line effects are a factor. For example, the termination circuit 110 may be disposed in a memory controller 152 at a sending end of a transmission line 154. Another termination circuit 110 may be disposed in a memory device 156 at a receiving end of the transmission line 154.

Figure 7:
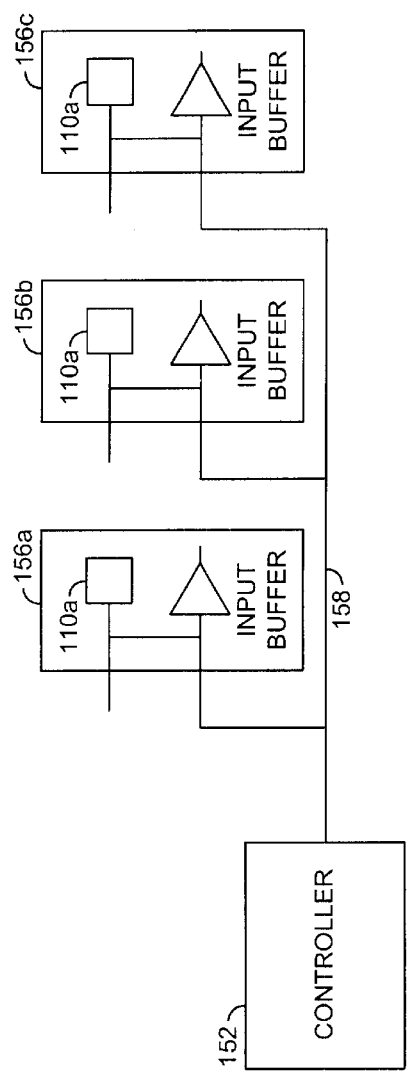
FIG. 7 is a block diagram of a multi-drop transmission system implementing the present invention.

Referring to FIG. 7, a block diagram of a multi-drop transmission line system is shown. Here, multiple instances of the termination circuit 110A may be located along a multi-drop transmission line 158. Here, only the termination circuit 110A in the last memory device 156C on the multi-drop transmission line 158 may receive the signal CNT in the enabled state. The other termination circuits 110A in the other memory devices 156A–B may receive the signal CNT in the disabled state.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
    a first transistor having (i) a first drain node configured to be coupled to a conductor, (ii) a first source node configured to be coupled to a first reference voltage, and (iii) a first gate node;
    a second transistor having (i) a second drain node configured to be coupled to said conductor, (ii) a second source node configured to be coupled to a second reference voltage, and (iii) a second gate node;
    a third transistor having (i) a third gate node coupled to a third drain node and (ii) a third source node coupled to said first gate node to bias said first gate node;
    a fourth transistor having (i) a fourth gate node coupled to a fourth drain node and (ii) a fourth source node coupled to said second gate node to bias said second gate node;
    a fifth transistor (i) in series with said first transistor, (ii) configured to conduct in response to a first control signal in an enable state and (iii) configured to not conduct in response to said first control signal in a disable state; and
    a sixth transistor (i) in series with said second transistor, (ii) configured to conduct in response to a second control signal in said enable state and (iii) configured to not conduct in response to said second control signal in said disable state.

2. The circuit according to claim 1, further comprising an inverter configured to invert said second control signal to present said first control signal.

3. The circuit according to claim 1, wherein said third drain node is biased to one of said first reference voltage and said second control signal.

4. The circuit according to claim 1, wherein said third gate node is biased to one of said first reference voltage and said second control signal.

5. The circuit according to claim 1, wherein said fourth drain node is biased to one of said second reference voltage and said first control signal.

6. The circuit according to claim 1, wherein said fourth gate node is biased to one of said second reference voltage and said first control signal.

7. The circuit according to claim 1, wherein (i) said first, second, third, fourth, fifth, and sixth transistors have a first, second, third, fourth, fifth, and sixth threshold voltage, respectively, (ii) said first threshold voltage is greater in magnitude than said third threshold voltage, and (iii) said second threshold voltage is greater in magnitude than said fourth threshold voltage.

8. The circuit according to claim 1, further comprising:
    a seventh transistor (i) in parallel with said fifth transistor, (ii) configured to conduct in response to said second control signal in said enable state and (iii) configured to not conduct in response to said second control signal in said disable state; and
    an eighth transistor (i) in parallel with said sixth transistor, (ii) configured to conduct in response to said first control signal in said enable state and (iii) configured to not conduct in response to said first control signal in said disable state.

9. A method for terminating a conductor of a transmission line comprising the steps of:
    (A) coupling a first reference voltage to a first source node of a first transistor having (i) a first drain node configured to be coupled to said conductor and (ii) a first gate node;
    (B) coupling a second reference voltage to a second source node of a second-transistor having (i) a second drain node configured to be coupled to said conductor and (ii) a second gate node;
    (C) biasing said first gate node through a third source node of a third transistor having a third gate node coupled to a third drain node; and
    (D) biasing said second gate node through a fourth source node of a fourth transistor having a fourth gate node coupled to a fourth drain node;
    (E) coupling said first transistor and said second transistor to said conductor in response to a control signal in an enable state; and
    (F) uncoupling said first transistor and said second transistor from said conductor in response to said control signal in a disable state.

10. The method according to claim 9, further comprising the step of inverting said control signal to present a complement control signal for said coupling and said uncoupling of said first transistor.

11. The method according to claim 9, further comprising the steps of:
   biasing said third drain node in response to said control signal in said enable state; and
   unbiasing said third drain node in response to said control signal in said disable state.

12. The method according to claim 9, further comprising the steps of:
   biasing said third gate node in response to said control signal in said enable state; and
   unbiasing said third gate node in response to said control signal in said disable state.

13. The method according to claim 9, further comprising the steps of:
   biasing said fourth drain node in response to said control signal in said enable state; and
   unbiasing said fourth drain node in response to said control signal in said disable state.

14. The method according to claim 9, further comprising the steps of:
   biasing said fourth gate node in response to said control signal in said enable state; and
   unbiasing said fourth gate node in response to said control signal in said disable state.

15. A circuit comprising:
   a first transistor having (i) a first drain node configured to be coupled to a conductor, (ii) a first source node configured to be coupled to a first reference voltage, and (iii) a first gate node;
   a second transistor having (i) a second drain node configured to be coupled to said conductor, (ii) a second source node configured to be coupled to a second reference voltage, and (iii) a second gate node;
   means for biasing said first gate node through a third source node of a third transistor having a third gate node coupled to a third drain node;
   means for biasing said second gate node through a fourth source node of a fourth transistor having a fourth gate node coupled to a fourth drain node;
   means (i) connected in series with said first transistor, (ii) for conducting in response to a first control signal in an enable state and (iii) for not conducting in response to said first control signal in a disable state; and
   means (i) connected in series with said second transistor, (ii) for conducting in response to a second control signal in said enable state and (iii) for not conducting in response to said second control signal in said disable state.

16. A circuit comprising:
   a first transistor of a first-channel type configured to clamp a conductor to a first reference voltage;
   a second transistor of a second-channel type configured to clamp said conductor to a second reference voltage;
   a third transistor of said first-channel type configured to bias a gate node of said second transistor through a source node of said third transistor;
   a fourth transistor of said second-channel type configured to bias a gate node of said first transistor through a source node of said fourth transistor; and
   a fifth transistor configured to uncouple said second transistor from said conductor in response to a control signal.

17. The circuit according to claim 16, wherein a gate node and a drain node of said third transistor are coupled to said first reference voltage.

* * * * *